United States Patent
Blain et al.

[11] Patent Number: 5,694,764
[45] Date of Patent: Dec. 9, 1997

[54] FUEL PUMP ASSIST FOR ENGINE STARTING

[75] Inventors: Edward S. Blain; Tim Sullivan; Stuart A. Greenwood, all of San Diego; Michael W. Sledd, Vista, all of Calif.; Kent Weber; Robert L. Bracken, both of Rockford, Ill.

[73] Assignee: Sundstrand Corporation, Rockford, Ill.

[21] Appl. No.: 529,930

[22] Filed: Sep. 18, 1995

[51] Int. Cl.$^6$ .................................................. F02C 7/26
[52] U.S. Cl. ............................ 60/39.142; 60/39.141; 60/734
[58] Field of Search ............... 60/39.142, 39.48, 60/740, 39.141, 39.461, 734; 123/447, 179.16, 179.17

[56] References Cited

U.S. PATENT DOCUMENTS

| | | | |
|---|---|---|---|
| 3,231,046 | 1/1966 | Ohrnberger | 184/6 |
| 3,306,038 | 2/1967 | Ferriman | 60/39.29 |
| 3,768,249 | 10/1973 | Lewis | 60/39.14 |
| 4,033,115 | 7/1977 | Baits | 60/39.09 R |
| 4,612,766 | 9/1986 | Eder | 60/261 |
| 4,693,073 | 9/1987 | Blackburn | 60/39.142 |
| 4,864,815 | 9/1989 | Cygnor | 60/39.141 |
| 5,022,228 | 6/1991 | Hoopes et al. | 60/734 |
| 5,152,271 | 10/1992 | Matsumura | 123/447 |
| 5,220,793 | 6/1993 | McGlone et al. | 60/734 |

FOREIGN PATENT DOCUMENTS

| | | | |
|---|---|---|---|
| 2642347 | 4/1977 | Germany | 60/39.142 |

*Primary Examiner*—Charles G. Freay
*Attorney, Agent, or Firm*—Lawrence E. Crowe

[57] ABSTRACT

An engine is provided having a fuel supply system which includes apparatus of straightforward construction that is powered solely by a flow of fuel through a delivery line to the engine for increasing the flow of fuel through the delivery line to the engine during start-up of the engine. A small control volume of pressurized fuel is stored during a preceding operational period of the engine for use in augmenting the fuel flow to the engine during a subsequent start-up of the engine. A converter apparatus is also disclosed for converting a portion of the fuel flow from the control volume and/or from a main fuel pump into an increased flow rate or pressure of fuel to the engine during the subsequent start-up. The control volume of fuel is stored in such a manner that volume compensation for changes in ambient temperature is provided, and in such a manner that the fuel line is positively shut off during periods of inoperation such that the fuel cannot leak out or evaporate and thus not be available for rapid start-up of the engine during a subsequent start.

17 Claims, 3 Drawing Sheets

FUEL PUMP ASSIST FOR ENGINE STARTING

TECHNICAL FIELD

This invention relates to engines and more particularly to a fuel supply system for an engine including apparatus for augmenting the flow-rate and pressure of fuel delivered to the engine by a main fuel pump during start-up of the engine.

BACKGROUND

Under certain circumstances it is necessary to temporarily boost the flow-rate and pressure of a flow of fuel to an engine during start-up of the engine in order to reliably achieve start-up of the engine. Engines which must be started after being cold-soaked for extended periods of time at low ambient temperatures provide one example of such circumstances. At cold ambient temperatures of −20° F. and below for example, liquid fuels become significantly more viscous than at normal ambient temperatures, such as 70° F. and above. After such cold-soaking, a main fuel pump sized to produce an adequate flow-rate of fuel only at the lower viscosities incident with operation at normal ambient temperatures may not be capable of providing an adequate flow of highly viscous fuel during start-up of the engine.

Another example of circumstances which may require boosting the flow-rate or pressure generated by a main fuel pump during engine start-up is found in engines having a main fuel pump driven by the engine at a pump speed that is proportional to engine speed. At start-up, both the engine and pump speeds will generally be low, relative to normal operating speeds, resulting in the pump being incapable of generating a sufficient flow-rate or pressure in the flow of fuel to the engine to reliably start the engine. This is particularly true where non-positive displacement fuel pumps, such as centrifugal pumps, are utilized, due to the inherently low flow and pressure generating capabilities of these pumps at speeds significantly below their normal operating speed.

One approach to solving the problems described above is to over-size the main fuel pump with respect to the fuel output required during normal operation, so that at start-up the pump will still be capable of providing an adequate flow of fuel to start the engine. This approach creates several problems, however. With an over-sized pump, the pump output pressure or flow at normal operating speeds may be excessive, necessitating the addition of pressure relief valves and bypass circuits which allow recirculation of excess fuel. Alternatively, a variable displacement pump may be required. In any event the extra cost, weight, and complexity of the fuel system entailed by this approach is generally undesirable. Furthermore, the additional power required to recirculate fuel through a bypass loop during normal operation of the engine is essentially wasted, thereby increasing operating costs of the engine.

Another approach to solving the problems described above is to provide apparatus powered by sources other than the engine itself for boosting the output of the fuel pump during start-up. Examples of such apparatus include electric motor driven fuel pumps, or fluid pressurizing systems relying on hydraulic or pneumatic power sources external to the engine. An example of a fuel system relying on an external power source is illustrated in FIG. 1 of U.S. Pat. No. 3,768,249 to Lewis. The need for an external source of power makes these approaches unattractive in many engine applications.

What is needed, therefore, is an apparatus and method for boosting the output of a main fuel pump during engine start without resorting to oversizing the pump, or relying on an external source of power. Prior attempts to provide such an apparatus are illustrated by U.S. Pat. No. 4,864,815 to Cygnor, and FIG. 2 of U.S. Pat. No. 3,768,249 to Lewis.

Cygnor discloses a fuel system including a turbine driven start pump commonly known as a "turbo-pump", with both the turbine and start pump receiving fuel from a main centrifugal pump. The turbine of the turbo-pump utilizes fuel supplied by the centrifugal pump at a high flow rate and low pressure to drive the start pump of the turbo-pump for increasing the pressure of the fuel to a pressure that is adequate for engine starting. The apparatus of Cygnor, therefore, purports to convert excess fuel flow during start-up into increased fuel pressure, and may thus not be suitable for use in engines having fuel pumps which do not produce a fuel flow-rate during start-up that is large enough to simultaneously drive the turbo-pump and provide a sufficient flow of fuel to the engine. Furthermore, Cygnor may not be capable of providing an essentially instantaneous boost of main fuel pump output required to obtain a reliable start in engines such as those driving emergency power plants, which must start on the first attempt after being cold-soaked for an extended period of time at low ambient temperatures.

Lewis discloses an apparatus utilizing an injector pump having a chamber in fluid communication with a point in a fuel delivery line connected to a combustor of a gas turbine engine, located between a non-return valve and the engine. One wall of the chamber is defined by a rolling diaphragm which engages a piston element biased against the pressure in the chamber by a spring. A stem extends from the piston element on the side thereof remote from the chamber and is formed with a recess engagable with a plunger of a solenoid when the piston element is in its extreme right-hand position, as seen in FIG. 2 of Lewis. In use, with the engine running, the fuel under pressure enters the chamber to compress the spring and latch the piston element, the solenoid not being energized under these conditions. When the engine is shut-down, the piston remains latched back against the spring. The solenoid is energized for a short period when the engine is started, and the fuel in the chamber is discharged to the engine. This arrangement purportedly requires no external pressure source, the injector pump being charged during a preceding operation of the engine.

The apparatus of Lewis does not, however, include any means for closing off the fuel delivery line between the non-return valve and the engine. Accordingly, without such a shut-off means neither the fluid pressure or the fuel within the chamber and fuel delivery lines are positively retained upon shut-down from the preceding operation of the engine. Upon the subsequent start-up of the engine, the pressure available for ejecting fuel from the chamber of Lewis is provided entirely by the force of the spring against the movable wall of the injector pump. The power expended during the previous operating period of the engine for pressurizing the fuel in the fuel line is thus lost when the engine is shut down. Also, by latching the movable wall in a fixed position with the solenoid, the chamber does not provide any means for compensating for changes in volume of the fluid therein related to operations at a temperature above or below that at which the solenoid blocks the movable wall in place. Furthermore, because the apparatus of Lewis provides no means for retaining fuel in the delivery line downstream of the injector pump while the engine is shut down, the possibility exists that the fuel in the line will leak out or evaporate during an extended period of shut down of the engine. If the fuel is lost due to leakage or evaporation, the device of Lewis loses its ability to augment the flow of fuel during start-up.

Accordingly, it is an object of our invention to provide an engine having a fuel system including apparatus powered solely by a flow of fuel through the fuel system for augmenting the flow rate and pressure of fuel delivered to the engine by a main fuel pump during start-up of the engine.

Other objects of our invention include providing:

1. An engine having a start system as above which is operable to augment the output of the main fuel pump during engine start-up over a wide range of ambient temperatures and atmospheric temperatures;
2. A fuel system for an engine as above which is compact, lightweight, of minimal complexity, producible at low cost, and provides high operational reliability;
3. A fuel system for an engine as above which provides rapid, reliable start-up of the engine after extended periods of inoperation while exposed to extreme ambient temperatures and pressure conditions, such that the fuel system provided is suitable for use in an emergency power plant; and
4. An engine fuel system for an engine as above having a centrifugal main fuel pump driven at a pump speed proportional to the engine speed.

SUMMARY OF THE INVENTION

Our invention meets the above objects by providing an engine having a fuel supply system which includes apparatus of straightforward construction that is powered solely by a flow of fuel through a delivery line to the engine for increasing the flow of fuel through the delivery line to the engine during start-up of the engine. In all embodiments of our invention a small control volume of pressurized fuel is stored during a preceding operational period of the engine for use in augmenting the fuel flow to the engine during a subsequent start-up of the engine. Some embodiments of our invention also use a converter apparatus to convert a portion of the fuel flow from the control volume and/or from a main fuel pump during the start-up of the engine into an increased flow rate or pressure of fuel to the engine during the subsequent start-up.

In all embodiments of our invention the control volume of fuel is stored in such a manner that volume compensation for changes in ambient temperature is provided, and in such a manner that the fuel line is positively shut off during periods of inoperation such that the fuel cannot leak out or evaporate and thus not be available for rapid start-up of the engine during a subsequent start. The apparatus of the fuel system of our invention therefore provides significant advantage in comparison to prior fuel systems by virtue of being simpler in construction, totally independent of any outside source of power, and by offering enhanced reliability, particularly where an engine must sit idle for extended periods of time at extreme atmospheric conditions between a previous and a subsequent start-up of the engine.

Specifically, our invention provides an engine having a fuel system which includes a main fuel pump having an inlet adapted for receipt of a flow of fuel from a fuel source, and an outlet for delivery of that flow of fuel to the fuel supply system. A fuel delivery line connects the outlet of the main fuel pump to the engine for delivering the flow of fuel to the engine. Apparatus powered solely by the fuel flow through the delivery line is provided for increasing the flow of fuel through the delivery line to the engine during start-up of the engine. The main fuel pump pressurizes the flow of fuel in the delivery line during both a start-up mode and a normal operating mode of the engine.

According to one embodiment of our invention, the fuel supply system includes pressurized fluid storage means powered solely by the flow of pressurized fuel through the delivery lines for increasing the flow of fuel delivered to the engine during the start-up mode of operating the engine. According to a preferred embodiment of our invention, the pressurized fluid storage means includes a check valve, an accumulator, and a shut-off valve disposed sequentially in a series fluid flow relationship in the delivery line between the outlet of the main fuel pump and the engine respectively. The check valve is disposed adjacent the outlet of the pump and configured to allow a flow of fuel through the delivery line from the outlet toward the engine and to block a flow of fluid from the check valve toward the outlet of the pump. The shut-off valve is disposed adjacent the engine and configured to allow a flow of fuel through the delivery line when the shut-off valve is in an open position, and is further configured to selectively block a flow of the fuel through the delivery line when the shut-off valve is in a closed position. The accumulator is operably connected in fluid communication with the delivery line at a point in the delivery line between the check valve and the shut-off valve. The accumulator is configured to receive a flow of fuel from the delivery line when the pressure of the fluid in the delivery line is respectively above a predetermined pressure of the fluid in the delivery line. The accumulator is also configured to deliver a flow of fuel to the delivery line when the pressure of the fluid in the delivery line is respectively below a predetermined pressure of fluid in the delivery line. According to a highly preferred version of this embodiment of our invention, the accumulator is configured to store a predetermined control volume of pressurized fluid therein which is approximately equal to only that volume of fluid required for engine start-up, in addition to the flow of fluid produced by the main fuel pump during engine start-up, such that the fluid supplied by the accumulator during engine start-up augments the flow of fluid produced by the main fuel pump to an extent required for providing a total flow of fuel to the engine which is adequate for reliable starting of the engine.

According to another embodiment of our invention, the fuel supply system further includes conversion means powered solely by the pressurized fluid storage means for converting a first flow of fuel received at relatively high pressure and low flow rate from the pressurized fluid storage means into a second flow of fuel through the delivery line to the engine at a pressure relatively lower than the high pressure of the first flow of fluid but at a flow rate relatively higher than the low flow rate of the first flow of fluid. In one version of this embodiment of the invention, a check valve is disposed in the delivery line and configured to allow a flow of fluid through the delivery line from the main fuel pump toward the engine and to block a flow of fluid from the engine toward the main fuel pump. An ejector disposed in the delivery line between the check valve and the engine is configured to augment the flow of fluid in the delivery line to the engine when supplied with a first flow of pressurized fluid from a fluid storage means such as the accummulator apparatus described above. In another version of this embodiment of our invention, the conversion means includes a turbo-pump disposed in the delivery line between the check valve and the engine, rather than an ejector, to induce a larger flow of fluid in the delivery line when supplied with a flow of pressurized fluid from the pressurized fluid storage means.

According to another embodiment of our invention, the fuel system includes a turbo-pump means having a pump portion operatively connected to be driven by either a first or a second turbine of the turbo-pump. The first turbine is adapted and configured to receive a first flow of fluid from the pressurized storage means, convert a portion of the energy in that first flow to a rotary output of the turbine for driving the pump, and to return the first flow to the delivery line at a point between a check valve and the engine. The second turbine is adapted and configured to receive a first flow of fluid from the main fuel pump, convert a portion of the energy in that first flow to drive the pump, and to return the first flow to the inlet of the pump, or to the fuel source. With this embodiment of our invention, the fuel flow or pressure provided to the engine is augmented both by the injection of a control volume of fuel stored in the pressurized fluid storage means during a preceding start through the first turbine, and a flow of fuel provided during the present engine start by the main fuel pump through the second turbine of the turbo-pump. Those skilled in the art will recognize this embodiment of our invention may in some engine applications provide a more rapid start, and more augmentation of the main fuel pump output can be achieved than can be achieved by utilizing either the pressurized fluid storage means or the conversion means of our invention separately.

Other objects, aspects, and advantages of our invention will become readily apparent upon consideration of the following drawings and detailed descriptions of the preferred embodiments.

DESCRIPTION OF THE INVENTION

Figure 1:
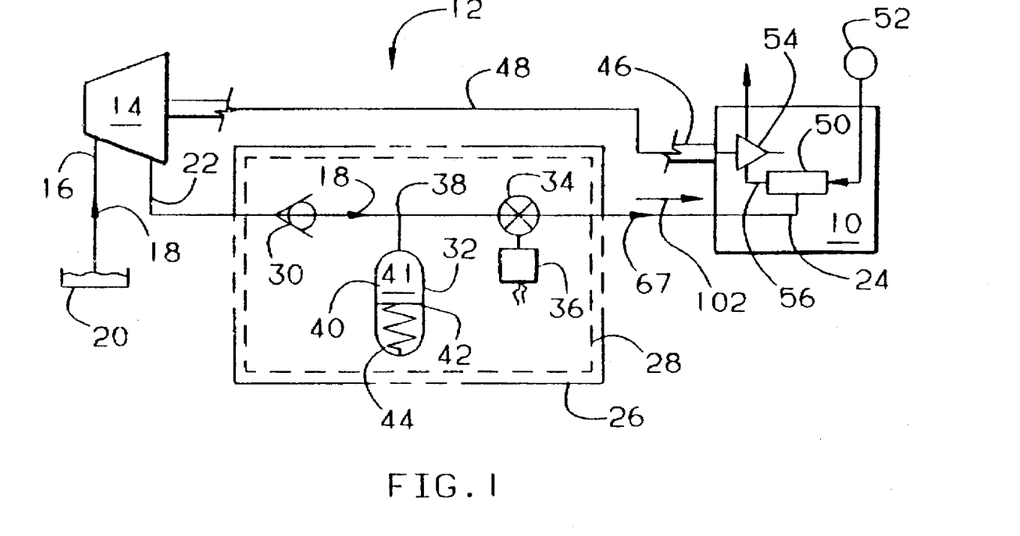
FIGS. 1–4 are schematic representations of alternate embodiments of an engine and fuel system according to our invention, wherein like reference numerals illustrate like features or elements.

FIG. 1 depicts an exemplary embodiment of our invention in the form of an engine 10 having a fuel supply system 12 including a main fuel pump 14 having an inlet 16 adapted for receipt of a flow of fuel, as indicated by arrows 18, from a fuel source 20. The main fuel pump 14 also includes an outlet 22 for delivery of the flow of fuel 18 to the fuel supply system 12. A fuel delivery line 24 connects the outlet 22 of the main fuel pump 14 to the engine 10 for delivering the flow of fuel 18 to the engine 10. The fuel supply system 12 includes means 26 powered solely by the fuel flow 18 through the delivery line 24 for increasing the flow of fuel 18 through the delivery line 24 to the engine 10 during start-up of the engine 10.

As shown in FIG. 1, the main fuel pump 14 pressurizes the flow of fuel 18 in the delivery line 24 during both a start-up mode and a normal operating mode of the engine 10. In the embodiment of FIG. 1, the means 26 for increasing the flow of fuel during engine start-up includes pressurized fluid storage means 28 powered solely by the flow 18 of pressurized fuel through the delivery line 24 for increasing the flow of fuel 18 delivered to the engine 10 during the start-up mode of operating the engine 10. The pressurized fluid storage means 28 includes a check valve 30, an accumulator 32, and a shut-off valve 34, disposed sequentially in a series fluid flow relationship in the delivery line 24 between the outlet 22 of the main fuel pump 14 and the engine 10 respectively. The check valve 30 is disposed adjacent the outlet 22 and configured to allow a flow of fuel 18 through the delivery line 24 from the outlet 22 toward the engine 10, and to block a flow of fluid in a direction opposite that depicted by arrow 18 from the check valve 30 toward the outlet 22 of the pump 14. The check valve 30 may be of any type of construction known in the art, such as a simple spring-loaded ball type valve. The shut-off valve 34 is disposed adjacent the engine 10 and is configured to allow a flow of fuel 18 through the delivery line 24 when the shut-off valve 34 is in an open position. The shut-off valve 34 is further configured to selectively block a flow of fuel through the delivery line 24 in either direction when the shut-off valve 34 is in a closed position. A solenoid 36 is illustrated in FIG. 1 for moving the shut-off valve 34 from the open to closed position, but our invention may be practiced with equal efficacy using a variety of manual or automatic actuators other than the solenoid specifically illustrated.

The accumulator 32 is operably connected in fluid communication with the delivery line 24 at a point 38 in the delivery line 24 between the check valve 30 and the shut-off valve 34. The accumulator 32 defines an internal cavity 40 for receipt of a control volume 41 of fuel from the delivery line 24. The internal cavity 40 of the accumulator is partially defined by a movable wall 42 of the accumulator 32. The movable wall 42 is operably connected to spring means 44 which urge the movable wall 42 toward a position providing minimum capacity of the internal cavity 40. The movable wall 42 can be provided by any of a number of devices known in the art such as a diaphragm, a piston, or a bellows, or an elastomeric bladder. The spring means 44 may be provided by an actual spring, the inherent spring rate of a metal bellows utilized to form the movable wall, or a pressurized gas chamber acting on the movable wall, etc., as is known in the art. Through judicious design the movable wall and spring means, the accumulator 32 can readily be configured to receive a flow of fuel from the delivery line 24 when the pressure of the fluid in the delivery line 24 is respectively above a predetermined pressure of fluid in the delivery line 24, and to deliver a flow of fuel to the delivery line when the pressure of fluid in the delivery line 24 is respectively below a predetermined pressure of the fluid in the delivery line 24.

The main fuel pump 14 is configured to generate a first fluid pressure and flow of fuel in the delivery line 24 when the engine 10 is at a nominal or normal operating speed, and a second fluid pressure and flow less than the first fluid pressure and flow when the engine 10 is at a speed less than that nominal or normal operating speed. The predetermined pressure at which the pressure of the fuel in the delivery line 24 acting on the movable wall 42 will overcome the spring means 44 and allow the control volume 41 of fluid to enter the internal cavity of the accumulator 32 is selected to fall between the first and second fluid pressures created by the main fuel pump 14. For example, in an engine having a main fuel pump producing a flow of fuel at a pressure of about 1,000 psi when the engine is operating at normal operating speed, and capable of producing a flow of fuel at only about 100 psi during staff-up of the engine, a predetermined pressure of about 250 psi might be selected, such that the control volume of fluid 41 stored at 1,000 psi during a preceding normal operating mode of the engine can be discharged at a minimum of 250 psi during a subsequent staff for augmenting the output of the main fuel pump 14 during that subsequent staff. The combined flows from the pressurized storage means 28 and the main fuel pump 14 are thus available during the subsequent staff-up mode of operating the engine 10.

In a highly preferred embodiment of our invention, offering minimum size and weight of the pressurized storage means, the accumulator 32 is configured to store a predetermined control volume 41 of pressurized fluid therein which is approximately equal to only that volume of fluid required, in addition to the flow of fluid produced by the main fuel pump 14, for ensuring a reliable start on the first attempt during a subsequent engine start-up. The control volume 41 of fuel supplied by the accumulator 32 during the subsequent start-up thereby augments the flow of fluid produced by the main fuel pump 14 to only the extent required for providing a total flow of fuel for a short time to the engine from the combined outputs of the main fuel pump and the pressurized storage means 28 which is adequate for reliable starting of the engine 10. Our invention is thus particularly useful in engines, as shown in FIG. 1, which include a rotary output 46 of the engine 10 rotatable at a rotating speed, and output drive means 48 operably coupling the main fuel pump 14 to the engine 10 for driving the main fuel pump 14 at a main pump speed proportional to the rotating speed of the rotary output 46 of the engine 10. With such an arrangement, and in particular where a non-positive displacement main fuel pump of a centrifugal type is utilized for instance, the output of the main fuel pump 14 when being driven at a start speed by a starter drive mechanism (not shown) powered by an electric motor, an air turbine starter, or a hand crank, etc., may be considerably below that needed to provide a reliable engine start. The fuel supply system 12 of our invention solves this problem by augmenting the output of the main fuel pump 14 during start-up.

Our invention is thus particularly useful in engine such as those powering an emergency power plant in an aircraft, as shown in FIG. 1, wherein the engine 10 is a gas turbine engine including a combustor 50 operably connected to the delivery line 24 and an oxidant source 52 for receiving a flow of fuel and oxidant therefrom and combusting the fuel to provide a flow of hot gases of combustion at an outlet 56 of the combustor to a gas turbine 54 operably connected between the outlet 56 of the combustor 50 and a rotary output 46 operably connected to drive the main fuel pump 14. In such gas turbine engines the start speed is typically between about 5–10% of normal operating speed. If the main fuel pump 14 is a centrifugal pump driven by the turbine 54, the pump 14 may produce a flow of fuel so low that, without the fuel system 12 of our invention, multiple attempts might be required to fill the fuel delivery line 24 with enough pressurized fuel to start the engine 14. This would be particularly true after an extended period of inoperation at the extreme ambient conditions, such as minus 65° F., which might be encountered by the emergency power plant in an aircraft operating at high altitudes.

Through utilization of an engine having a fuel staff system including the pressurized storage means 28 as described above, we believe that reliable engine start can be achieved with virtual certainty on a first try within less than a second after the shut-off valve 34 is opened. Specifically, we anticipate that in a fuel system operating at a nominal pump discharge pressure of 400 psi during a normal mode of operation, a subsequent start could be achieved in less than 0.2 of a second after opening the shut-off valve. We further anticipate that a fuel flow at a minimum pressure of 200 psi adequate for starting the engine 10 can be provided over a temperature range of −65° F. to 275° F. utilizing a control volume of fuel of one cubic inch or less, dependent of course upon the physical size and configuration of the fuel line 24 and the engine 10.

Figure 2:
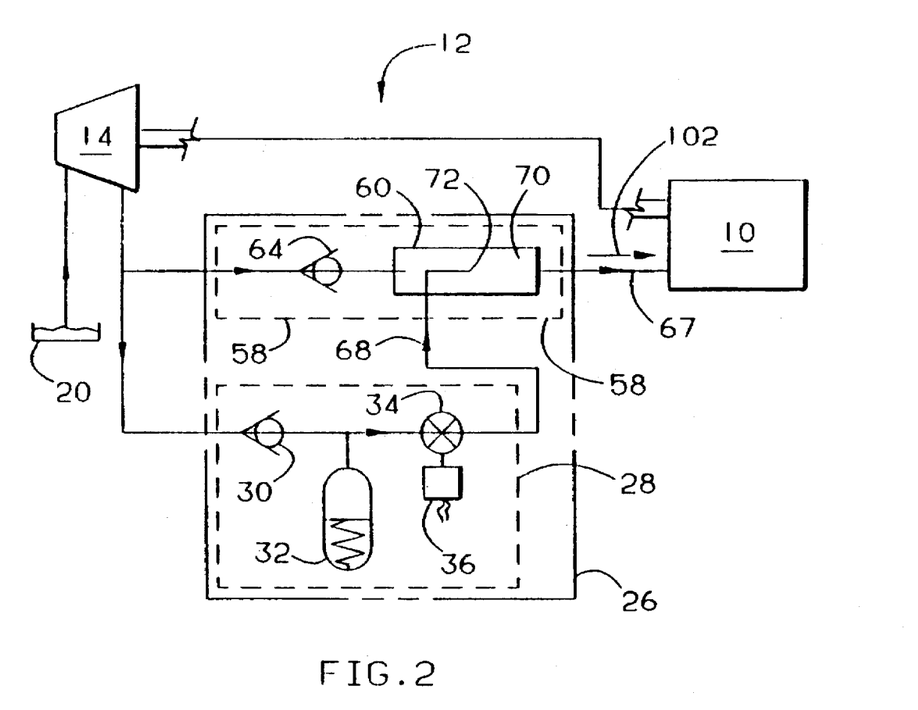
Figure 3:
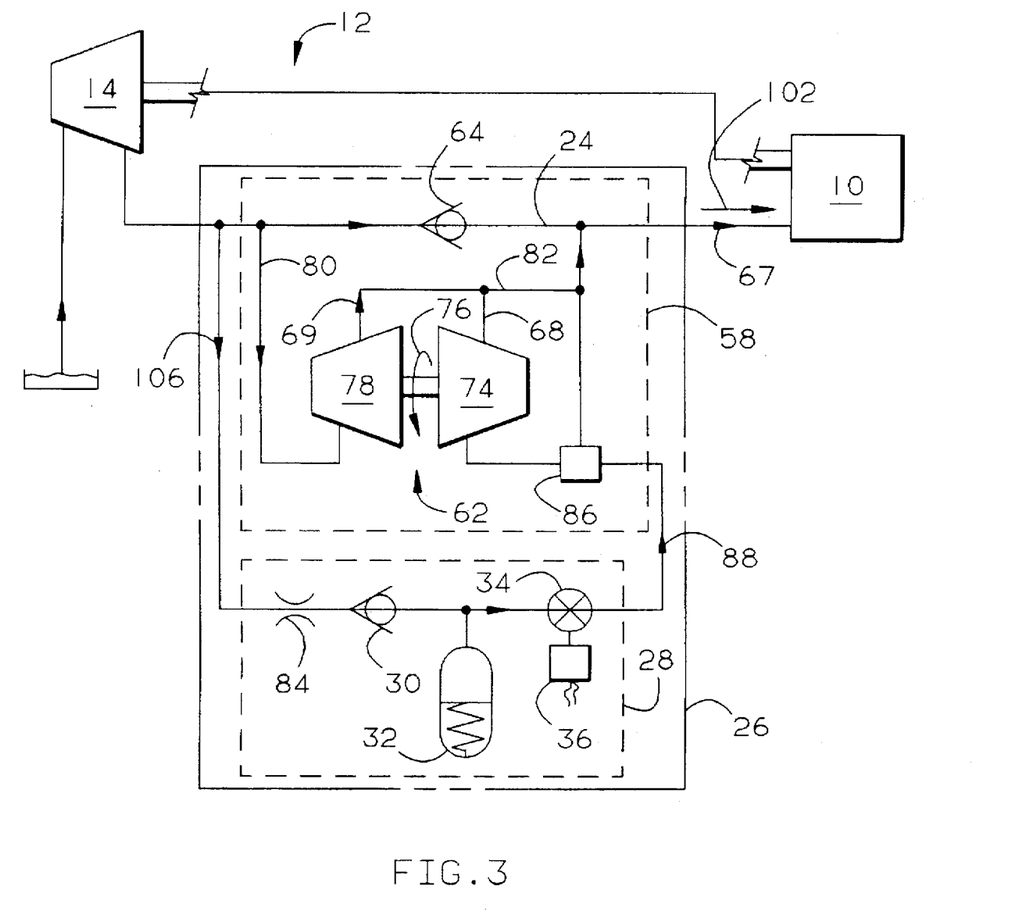

FIGS. 2 and 3 depict embodiments of our invention wherein the means for increasing fluid flow 26 of the fuel supply system 12 further includes conversion means 58 powered solely by the pressurized fluid storage means 28 as described above for converting a first flow of fuel 68 received at relatively high pressure and low flow rate from the pressurized fluid storage means 28 into a second flow of fuel 67 through the delivery line to the engine at a pressure relatively lower than the high pressure of the first flow 68 of fluid and at a flow rate relatively higher than the low flow rate of the first flow 68 of fluid. The embodiment of FIG. 2 utilizes an ejector 60 as part of the conversion means 58 for augmenting a flow of fuel to the engine 10, whereas in the embodiment depicted in Fig. 3 a turbo-pump 62 is utilized in place of the ejector 60 in the conversion means 58 for augmenting the flow of fuel to the engine 10.

Specifically, with reference to the embodiment depicted in FIG. 2, the conversion means 58 includes a check valve 64 disposed in the delivery line 24 and configured to allow a flow of fuel through the delivery line 24 from the main fuel pump 14 toward the engine 10, and to block a flow of fluid from the engine 10 toward the main fuel pump 14. The ejector 60 is disposed in the delivery line 24 between the check valve 64 and the engine 10, and is configured to induce a second flow 67 of fluid in the delivery line 24 when supplied with a first flow 68 of fluid from the pressurized fluid storage means 28, in a manner well known by those familiar with the operation of such ejector devices. The ejector 60 includes a main flow channel 70 defining a portion of the delivery line 24, and nozzle means 72 disposed within the main flow channel 70 of the ejector for inducing the second flow 67 of fluid in the main channel 70 when the first flow 68 of fluid is directed through the nozzle means 72.

As shown in FIGS. 1 and 2, the pressurized fluid storage means 28 of the embodiments of our invention depicted therein includes an accumulator 32, check valve means 30 and a solenoid operated shut-off valve means 34, 36 arranged identically to that described above with regard to FIG. 1. Those skilled in the art will readily recognize, however, that many other arrangements of known hydraulic components might also be used to configure a pressurized fluid storage means within the scope of the appended claims describing our invention.

In the embodiment of our invention depicted in FIG. 3, the conversion means 58 includes a check valve 64 disposed in the delivery line 24 and configured to allow a flow of fluid through the delivery line 24 from the main fuel pump 14 toward the engine 10, and to block a flow of fluid from the engine 10 towards the main fuel pump 14. Turbo-pump means 62 are disposed in the delivery line 24 between the check valve 64 and the engine 10 and configured to induce a second flow of fluid 67 in the delivery line 24 when supplied with a first flow of fluid 68 from the pressurized fluid storage means 28, with the turbo-pump means 62 functioning to increase the flow-rate or pressure of second flow 67 above that provided by the first flow 68. The turbo-pump 62 includes a turbine 74 adapted and configured to: receive the first flow of fluid 68 from the pressurized storage means 28; convert a portion of the energy in that first flow 68 to a rotary output 76 of the turbine 74; and to return the first flow 68 to the delivery line 24 at a point between the check valve 64 and the engine 10. The turbo-pump 62 further includes a pump 78 having an inlet 80 in fluid communication with the delivery line 24 at a point between the main fuel pump 14 and the check valve 64, and an outlet 82 connected in fluid communication with the delivery line at a point between the check valve and the engine. The pump 78 is operatively connected to the rotary output 76 of the turbine 74 to be driven thereby, and configured to generate an auxiliary flow of fluid 69 from the inlet to the outlet of the pump when driven by the rotary output 76 of the turbine 74. The auxiliary flow 69 produced by the pump 78 of the turbo-pump 62 is combined with the first flow 68 of fluid through the turbine 74 to produce the second flow 67 of fluid to the engine 10.

The pressurized fluid storage means 28 of the embodiment of our invention depicted in FIG. 3 include an accumulator 32, check valve means 30, and solenoid operated shut-off valve means 34, 36 as described above for the embodiment of our invention depicted in FIGS. 1 and 2. The conversion means 58 of the embodiment depicted in FIG. 3 also includes a turbo-pump control valve 86 disposed between the output of the pressurized storage means 28 and the input of the turbine 74 of the turbo-pump, for controlling both turbo-pump speed and output pressure of the pump 78. The control valve 86 is configured to shut off completely as normal operating speeds of the engine and fuel pressures in the delivery line 24 are obtained, and to open again when pressure in the fuel line 24 falls during shut down of the engine 10. With such an arrangement, no external signals or controls are required.

As seen in FIG. 3, it may also be desirable to add a flow restricting orifice means 84 in the line connecting the accumulator 32 to the delivery line 24, for restricting the rate of flow 106 into the accumulator 32, to thereby balance the rate of flow through the pressurized storage means with the flow 18 provided by the main pump 14 through the delivery line 24 to the engine 10.

Figure 4:
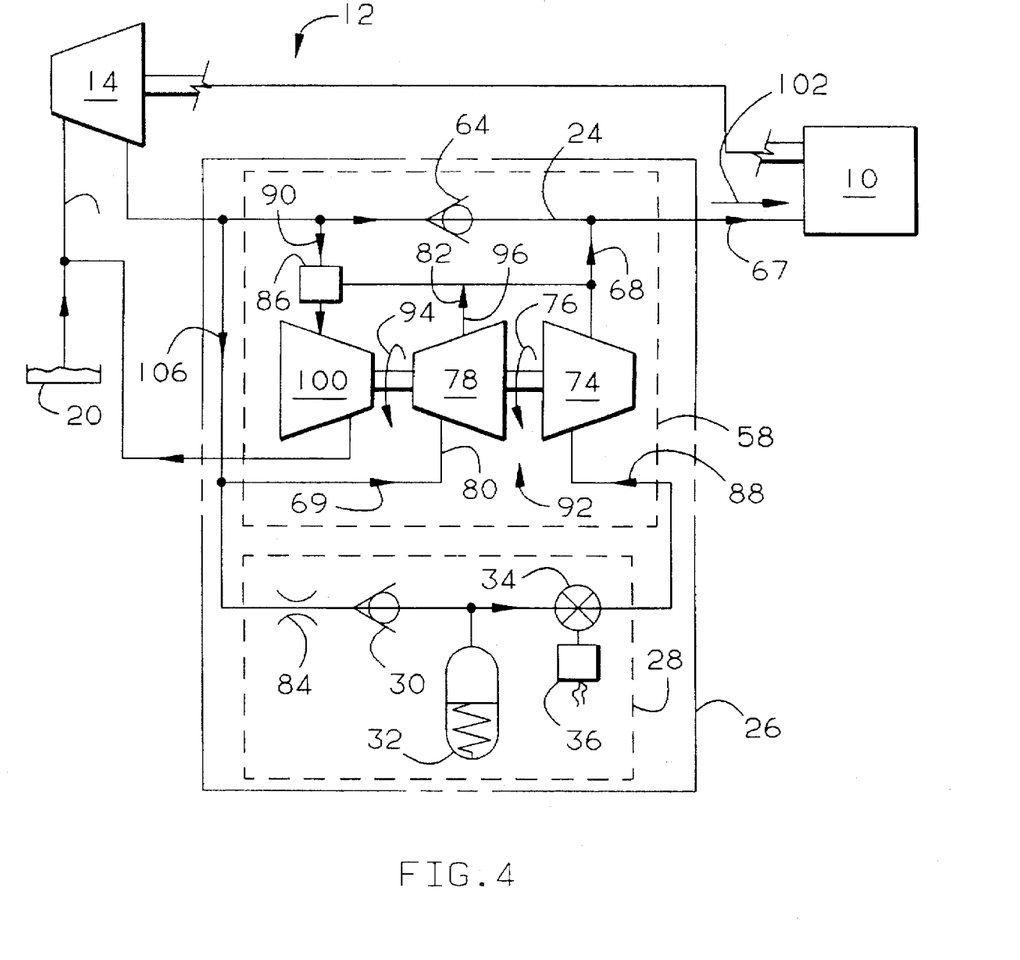

FIG. 4 illustrates an embodiment of our invention in which the conversion means 58 are configured to be selectively powered alternatively by either a first flow 88 of pressurized fluid from the pressurized fluid storage means 28 or from a first flow of fuel 90 from the main fuel pump 14. Where the first flow 88 is provided by the pressurized fluid storage means 28, the conversion means are configured to convert that first flow 88 of fuel from a relatively high pressure and low flow rate into a second flow of fuel 67 through the delivery line 24 to the engine 10 at a pressure relatively lower than that delivered by the pressurized fluid storage means and at a flow rate relatively higher than the first flow rate 88 received from the pressurized fluid storage means 28. When powered by a first flow 90 of fuel from the main fuel pump 14, the conversion means function to convert the first flow of fuel 80 from a relatively low pressure and high flow rate, as received from the main fuel pump, into a second flow of fuel 67 through the delivery line 24 at a pressure relatively higher than the low pressure of the first flow 80 of fluid from the main fuel pump 14, and at a flow rate 67 relatively lower than the high flow rate of the first flow 90 of fluid from the main fuel pump 14.

In general, the embodiment of our invention depicted in FIG. 4 is similar to the embodiment described above with regard to FIG. 3, in that both use turbo-pump means 62, 92 in conjunction with a pressurized fluid storage means 28 to augment the output of the main fuel pump 14. Specifically, in the embodiment depicted in FIG. 4, the conversion means 58 includes a check valve 64 disposed in the fluid delivery line 24 and configured to allow a flow of fluid to the delivery line 24 from the main fuel pump 14 toward the engine 10, and to block a flow of fluid from the engine 10 toward the main fuel pump 14. The turbo-pump means 92 of the embodiment of FIG. 4, is disposed in the delivery line 24 between the check valve 64 and the engine 10, and is configured to induce a second flow of fluid 67 in the delivery line when supplied with a first flow of fluid 88, 90, from either the pressurized fluid storage means 28 or the main fuel pump 14, respectively. The turbo-pump 92 includes a first turbine 74 adapted and configured to receive the first flow 88 of fluid from the pressurized fluid storage means 28. The first turbine 74 converts a portion of the energy in the first flow 88 of fuel into a rotary output 76 of the first turbine 74 and returns the first flow 88 to the delivery line 24 at a point between the check valve 64 and the engine 10. The turbo-pump 92 of the embodiment in FIG. 4 also includes a second turbine 100 adapted and configured to receive the first flow 90 of fuel from the main fuel pump 14. The second turbine 100 converts a portion of the energy in the first flow 90 into a rotary output 94 of the second turbine and returns the first flow 90 to the inlet 16 of the main fuel pump 14. The turbo-pump 92 further includes a pump 78 having an inlet 80 in fluid communication with the delivery line 24 at a point between the main fuel pump 14 and the check valve 64, and an outlet 82 connected in fluid communication with the delivery line 24 at a point between the check valve 64 and the engine 10. The pump 78 is operatively connected to the rotary outputs 76, 94 of both the first and second turbines 74, 100 to be driven alternatively or jointly thereby, and configured to generate an auxiliary flow of fluid 96 from the inlet 80 to the outlet 82 of the pump 78 when driven by the rotary output 76, 94 of either the first or second turbine 74, 88. Auxiliary flow 96 of fluid from the pump 78 is combined with the first flow 68 of fluid through the first turbine 74 to produce the second flow 67 of fuel to the engine 10.

As shown in FIG. 4, the pressurized fluid storage means of this embodiment of the invention may be provided by a check valve 30, an accumulator 32 and a solenoid operated shut-off valve 34, 36 in the same manner as described with regard to embodiment depicted in FIGS. 1 through 3. It may also be desirable in some embodiments of our invention to incorporate a fuel restricting orifice 84 and a throttling valve 86 into the pressurized fluid storage means 28 and conversion means 58 respectively, to help balance and direct a flow of fuel through the fuel system 26. The throttling valve 86 may be located to control the flow rate of fuel through either or both of the first turbine 74 as indicated in FIG. 3, or the second turbine 88 of the turbo-pump 92 as indicated in FIG. 4, dependent upon the particular application of our invention.

With all embodiments of our invention depicted in FIGS. 1 through 4, the pressurized fluid storage means are utilized to store a control volume of fuel 41 from a previous period of normal operation of the engine 10 for use in augmenting the flow of fuel from the main fuel pump 14 during a subsequent start-up mode of operating the engine. Specifically, the engine 10 is operated at normal speed to establish a flow of pressurized fuel from the main fuel pump 14 to the engine 10. The pressure of the fuel in the delivery line 24 acting on the movable wall 42 of the accumulator will compress the spring means 44 and cause a flow of fuel into the internal cavity 40 of the accumulator 32. Just prior to shutting down normal operation of the engine 10, the shut-off valve 34 is closed to trap a control volume of fluid 41 within the accumulator between the check valve 30 and the shut-off valve 34. Any fuel remaining in the delivery line 24 between the shut-off valve and the engine 10 may be consumed prior to engine shut-down or simply drained from the line following engine shut-down to prevent coking of that fuel due to heat soak-back once the engine is shut-down. Upon a subsequent start attempt, the shut-off valve 34 is opened simultaneously with initiating of spin up of the engine 10 by a start motor means (not shown). The control volume 41 of fuel stored at normal system fuel pressure within the accumulator is immediately injected into the delivery line 24 by the action of the accumulator 32 at a pressure and flow rate sufficient to augment the flow of fuel from the main fuel pump 14 to such a degree that the engine 10 can be reliably started on the first try.

Because the movable wall 42 of the accumulator 32 in our invention is free to move during the period of engine inoperation, the accumulator of our invention provides automatic adjustment of the position of the movable wall 42 to thereby provide automatic volume compensation, should the temperature of the fuel at shut-down differ from the temperature of the fuel on a subsequent start attempt. If the movable wall 42 were latched in position, as taught by FIG. 2 of the Lewis patent referenced in the Background section of this application, no volume compensation would be provided, and the spring means 44 would most likely need to have a significantly longer stroke to ensure that the control volume of fluid was provided to the engine at a pressure and flow rate sufficient to achieve an engine start. Furthermore, by trapping the control volume of fluid 41 between the check valve 30 and the shut-off valve 34, the availability of a control volume 41 is ensured for the subsequent start. Were it not for the presence of the check valve 30 and shut-off valve 34, the potential would exist in an arrangement such as that taught by Lewis for the fuel to evaporate from the control volume or simply leak away during long periods of inoperation, thereby making the fuel system 12 of our invention clearly superior to that taught by Lewis for applications such as emergency power plants which must endure extended periods of inoperation and yet start virtually without fail on a first start attempt following such an extended period of inoperation.

The embodiments of our invention depicted in FIGS. 2 through 4 provide means for increasing the pressure and/or flow rate of the fuel from the pressurized fluid storage means to the engine 10, in those engine applications wherein the simpler arrangement as described with regard to FIG. 1 might not produce sufficient flow or pressure to reliably start the engine 10. In particular, it will be recognized that the embodiment of our invention described with reference to FIG. 4 provides a means for augmenting the flow of the fuel pump 14 in an engine application where it may be impractical to provide an accumulator 32 of a size large enough to store all of the energy needed for an engine start, even with the benefit of the conversion means depicted in FIGS. 2 and 3. It may also be that the available power extraction from the main engine fuel pump 14 is insufficient at very low engine cranking speeds to operate the converter means 58. In this event, the embodiment depicted in FIG. 4 provides the option of using the accumulator/converter means as depicted in FIGS. 2 and 3 initially when the speed is very low and transitioning to the main engine fuel pump/converter as the speed rises. As the speed reaches the low end of the normal operating speed envelope for the engine, the converter means 58 can be shut down by using the throttling valve 86.

We also wish to specifically point out that, for the sake of clarity, throughout the above descriptions of exemplary embodiments of our invention above, the second flow 67 to the engine 10 has included only those components 67, 68, 69, 96 of the total flow of fuel 102 reaching the engine 10 which passed through the pressurized storage means 28 and the conversion means 58. The term "second flow" of fuel or fluid as used herein is defined to also include any component of flow 18 produced by the main fuel pump 14 during start-up. The total flow 102 reaching the engine 10 is thus a second flow 67, or 18, or a combination, thereof, depending upon the design of the various components of the engine and fuel system, and the operating speed of the engine. In some embodiments and circumstances, the total or second flow 102, 67 will be provided entirely by action of the pressurized storage means 28 of our invention. In other embodiments or circumstances, the fuel system 12 of our invention will serve to merely augment the flow 18 produced by the main fuel pump 14 during start-up.

From the foregoing description, those skilled in the art will readily recognize that our invention overcomes problems encountered in prior apparatus for augmenting the output of a main fuel pump during the start-up of an engine. The engine and fuel system of our invention make it possible to have an engine, such as that powering an emergency power plant, on line and operating within a few seconds of receiving a start command, even where the engine and fuel system have been exposed to extreme ambient conditions prior to attempting the start-up. The fuel system of our invention is a straightforward design which eliminates much of the cost, weight, and complexity of prior engine fuel systems.

Those skilled in the art will further recognize that, although we have described our invention herein with respect to several embodiments and applications thereof, many other embodiments and applications of our invention are possible within the scope of our invention as described in the appended claims. For example, the engine start system of the embodiments presented herein can be utilized with types of engines other than the gas turbine engine specifically referenced with regard to the embodiment depicted in FIG. 1. The specific interconnection of the various elements of the engine and fuel system of our invention may also deviate substantially from the arrangements depicted schematically herein within the scope of our invention as defined in the appended claims. It is understood, therefore, that the spirit and scope of the appended claims should not be limited to the specific embodiments described and depicted herein.

We claim:

1. An engine having a fuel supply system comprising:
    a main fuel pump having an inlet adapted for receipt of a flow of fuel from a fuel source, and an outlet for delivery of said flow of fuel to said fuel supply system;
    a fuel delivery line connecting the outlet of said main fuel pump to said engine for delivery of fuel to said engine;
    pressurized fluid storage means powered solely by said flow of fuel through said delivery line for increasing the flow of fuel through said delivery line to said engine during start-up of the engine; and
    conversion means powered solely by said means for increasing the flow of fuel through the delivery line during start-up mode of the engine for converting a first flow of fuel received at relatively high pressure and low flow-rate from said pressurized flluid storage means into a second flow of fuel through said delivery line into said engine at a pressure relatively lower than the high pressure of said first flow of fluid and at a flow-rate relatively higher than the low flow-rate of said first flow of fluid.

2. The engine of claim 1 wherein
    said means powered solely by said flow of fuel is a pressurized fluid storage means.

3. The engine of claim 2 wherein said pressurized fluid storage means includes a check valve, an accumulator, and a shut-off valve disposed sequentially in a series fluid flow relationship in the delivery line between the outlet of the main fuel pump and the engine respectively;

said check valve being disposed adjacent said outlet and configured to allow a flow of fuel through said delivery line from said outlet toward said engine and to block a flow of fluid from said check valve toward said outlet;

said shut-off valve being disposed adjacent said engine and configured to allow a flow of fuel through said delivery line when said shut-off valve is in an open position, and further configured to selectively block a flow of said fuel through said delivery line when said shut-off valve is in a closed position; and said accumulator being operably connected in fluid communication with said delivery line at a point in said delivery line between said check valve and said shut-off valve;

said accumulator being configured to receive a flow of fuel from said delivery line when the pressure of the fluid in said delivery line is respectively above a predetermined pressure of fluid in said delivery line; and said accumulator also being configured to deliver a flow of fuel to said delivery line when the pressure of the fluid in said delivery line is respectively below a predetermined pressure of fluid in said delivery line.

4. The engine of claim 3 wherein said main fuel pump is configured to generate a first fluid pressure and flow of fuel in said delivery line when said engine is at a normal operating speed and a second fluid pressure and flow less than said first fluid pressure and flow when said engine is at a speed less than said normal operating speed, and wherein said predetermined pressure is selected to be between said first and second fluid pressures.

5. The engine of claim 3 wherein said accumulator is configured to store a predetermined control volume of pressurized fluid therein which is approximately equal to only that volume of fluid required in addition to the flow of fluid produced by the main fuel pump during engine start-up, the fluid supplied by the accumulator during start-up thereby augmenting the flow of fluid produced by the main fuel pump to an extent required for providing a total flow of fuel to the engine from said main fuel pump and said accumulator which is adequate for reliable starting of the engine.

6. The engine of claim 1 further including:

a rotary output of said engine rotatable at a rotating speed; and output drive means operably coupling said main fuel pump to said engine such that said engine drives said main fuel pump at a main pump speed proportional to said rotating speed of said rotary output of said engine.

7. The engine of claim 6 wherein said engine further includes:

a combustor operably connected to said delivery line and an oxidant source for receiving said flow of fuel and oxidant therefrom and combusting said fuel to provide a flow of hot gases of combustion at an outlet of said combustor;

a gas turbine operably connected between said outlet of said combustor and said rotary output for producing said rotary output when supplied with said hot gases of combustion; and wherein said main fuel pump is a centrifugal pump having an impeller operably coupled to said output drive means to be rotatably driven thereby at said main pump speed for supplying said flow of fuel to said delivery line at a pressure and flow rate proportional to said main pump speed.

8. The engine of claim 1 wherein said conversion means includes:

a check valve disposed in said delivery line and configured to allow a flow of fluid through said delivery line from said main fuel pump toward said engine and to block a flow of fluid from said engine toward said main fuel pump; and an ejector disposed in said delivery line between said check valve and said engine and configured to induce said second flow of fluid in said delivery line when supplied with said first flow of fluid from said pressurized fluid storage means.

9. The engine of claim 8 wherein:

said ejector includes a main flow channel defining a portion of said delivery line, and nozzle means disposed within said main flow channel for inducing said second flow of fluid in said channel; and said pressurized fluid storage means includes:

an accumulator connected in fluid communication with said delivery line to receive a flow of pressurized fluid therefrom, and also connected in a series flow relationship with said nozzle of said ejector for delivering said first flow of fluid thereto;

check valve means configured to block fluid flow from the accumulator into said delivery line along any path other than through said nozzle; and shut-off valve means disposed in a series flow relationship between said accumulator and said nozzle for selectively blocking or opening fluid communication between said accumulator and said nozzle.

10. The engine of claim 1 wherein said conversion means includes:

a check valve disposed in said delivery line and configured to allow a flow of fluid through said delivery line from said main fuel pump toward said engine and to block a flow of fluid from said engine toward said main fuel pump; and turbo-pump means disposed in said delivery line between said check valve and said engine and configured to induce said second flow of fluid in said delivery line when supplied with said first flow of fluid from said pressurized fluid storage means.

11. The engine of claim 10 wherein said turbopump means includes:

a turbine adapted and configured to receive said first flow of fluid from said pressurized fluid storage means, convert a portion of the energy in said first flow to a rotary output of said turbine, and to return said first flow to said delivery line at a point between said check valve and said engine; and a pump having an inlet in fluid communication with said delivery line at a point between said main fuel pump and said check valve, and an outlet connected in fluid communication with said delivery line at a point between said check valve and said engine;

said pump being operatively connected to the rotary output of said turbine to be driven thereby, and configured to generate said second flow of fluid from the inlet to the outlet of said pump when driven by said rotary output of said turbine.

12. The engine of claim 11 wherein said pressurized fluid storage means includes:

an accumulator connected in fluid communication with said delivery line to receive a flow of pressurized fluid therefrom, and also connected in a series flow relationship with said inlet of said turbine of said turbopump for delivering said first flow of fluid thereto;

check valve means configured to block fluid flow from the accumulator into said delivery line along any path other than through said turbine; and shut-off valve means disposed in a series flow relationship between said accumulator and said turbine for selectively blocking or opening fluid communication between said accumulator and said turbine.

13. An engine having a fuel supply system comprising:

a main fuel pump having an inlet adapted for receipt of a flow of fuel from a fuel source, and an outlet for delivery of said flow of fuel to said fuel supply system;

a fuel delivery line connecting the outlet of said main fuel pump to said engine for delivery of said flow of fuel to said engine; and pressurized fluid storage means powered solely by said flow of fuel through said delivery line for increasing the flow of fuel through said delivery line to said engine during start-up of the engine, said fuel supply system further including conversion means configured to be selectively powered alternatively by either:

a first flow of pressurized fluid from said pressurized fluid storage means for converting said first flow of fuel received at relatively high pressure and low flow-rate from said pressurized fluid storage means into a second flow of fuel through said delivery line to said engine at a pressure relatively lower than the high pressure of said first flow of fluid at a flow-rate relatively higher than the low flow-rate of said first flow of fluid; or a first flow of fuel from said main fuel pump for converting said first flow of fuel received at a relatively low pressure and a high flow rate from said main fuel pump into a second flow of fuel through said delivery line at a pressure relatively higher than the low pressure of said first flow of fluid from said main fuel pump at a flow rate relatively lower than the high flow rate of said first flow of fuel from said main fuel pump.

14. The engine of claim 13 wherein said conversion means includes:

a check valve disposed in said delivery line and configured to allow a flow of fluid through said delivery line from said main fuel pump toward said engine and to block a flow of fluid from said engine toward said main fuel pump; and turbopump means disposed in said delivery line between said check valve and said engine and configured to induce said second flow of fluid in said delivery line when supplied with said first flow of fluid from either said pressurized fluid storage means or said main fuel pump.

15. The engine of claim 14 wherein said turbopump means includes:

a first turbine adapted and configured to receive said first flow of fluid from said pressurized fluid storage means, convert a portion of the energy in said first flow to a rotary output of said first turbine, and to return said first flow to said delivery line at a point between said check valve and said engine;

a second turbine adapted and configured to receive said first flow of fluid from said main fuel pump, convert a portion of the energy in said first flow to a rotary output of said second turbine; and a pump having an inlet in fluid communication with said delivery line at a point between said main fuel pump and said check valve, and an outlet connected in fluid communication with said delivery line at a point between said check valve and said engine;

said pump being operatively connected to the rotary outputs of both said first and second turbines to be driven alternatively thereby, and configured to generate said second flow of fluid from the inlet to the outlet of said pump when driven by said rotary output of either said first or second turbines.

16. The engine of claim 15 wherein said pressurized fluid storage means includes:

an accumulator connected in fluid communication with said delivery line to receive a flow of pressurized fluid therefrom, and also connected in a series flow relationship with said inlet of said first turbine of said turbopump for delivering said first flow of fluid thereto;

check valve means configured to block fluid flow from the accumulator into said delivery line along any path other than through said first turbine; and shut-off valve means disposed in a series flow relationship between said accumulator and said first turbine for selectively blocking or opening fluid communication between said accumulator and said first turbine.

17. In an engine having a fuel system for delivering a flow of pressurized fuel to said engine during both the normal operating mode and a start-up mode of operation of said engine, wherein said fuel system includes a main fuel pump, a fuel delivery line for delivering said flow of pressurized fuel from said fuel pump to said engine, and means for augmenting said flow of fuel through said delivery line to said engine during start-up mode of operating the engine, a method for augmenting the flow rate of said flow of pressurized fuel during said start-up mode comprising the steps of:

a. operating said engine in said normal operating mode to establish said flow of pressurized fluid from said main fuel pump to said engine;

b. while said engine is operating in said normal operating mode, trapping and storing a portion of said flow of pressurized flow in a pressurized state as a control volume of pressurized fluid with said means for augmenting said flow of pressurized fuel;

c. upon subsequent operation of said engine in said start-up mode, injecting said control volume of pressurized fuel into said fuel system for augmenting said flow of pressurized fluid generated by said main fuel pump through said delivery line during start-up of the engine; and d. during said start-up of said engine, diverting a portion of said flow of pressurized fuel generated by said main fuel pump through said means for augmenting, and converting said portion of flow diverted into increased fluid pressure or flow-rate of the flow of pressurized fuel delivered to said engine through said delivery line.

* * * * *